(12) United States Patent
Ju et al.

(10) Patent No.: US 9,360,867 B2
(45) Date of Patent: Jun. 7, 2016

(54) APPARATUS AND METHOD FOR CONTROLLING DRIVING DEVICE OF SELF-DRIVING VEHICLE

(71) Applicant: Industry-Academic Cooperation Foundation, Yonsei University, Seoul (KR)

(72) Inventors: Da Young Ju, Incheon (KR); Sangho Lee, Daegu (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/622,741

(22) Filed: Feb. 13, 2015

(65) Prior Publication Data

US 2015/0234382 A1 Aug. 20, 2015

(30) Foreign Application Priority Data

Feb. 17, 2014 (KR) ........................ 10-2014-0017842

(51) Int. Cl.
*G01C 22/00* (2006.01)
*G05D 1/00* (2006.01)
(Continued)

(52) U.S. Cl.
CPC ................ *G05D 1/021* (2013.01); *G01S 7/003* (2013.01); *G01S 17/023* (2013.01)

(58) Field of Classification Search
CPC ................... G05D 2201/0202; G05D 1/0246; G05D 1/0274; G05D 1/0272; G05D 1/0276; G05D 1/0257; G05D 1/0077; G05D 1/027; G05D 1/028; G05D 2201/0209; G05D 1/0214; G05D 1/0295; G05D 1/0297; G06F 3/0488; G06F 11/00; G06F 13/364; G06F 17/30; G06F 13/14; G06F 21/10; G06F 21/45; G01C 21/10; G01C 21/20; G01C 21/34; G01C 15/00; G01C 21/28; G01C 21/30
USPC ........... 701/23, 24, 25, 28, 2, 14, 302, 37, 41, 701/42, 469, 470, 36, 3
See application file for complete search history.

(56) References Cited

U.S. PATENT DOCUMENTS 4,949,277 A * 8/1990 Trovato .................. B25J 9/1666
700/254
5,548,773 A * 8/1996 Kemeny ............. G06Q 30/0283
701/533

(Continued)

FOREIGN PATENT DOCUMENTS

KR  10-2004-0044034  5/2004
KR  10-2005-0089647  9/2005

(Continued)

*Primary Examiner* — Calvin Cheung
*Assistant Examiner* — Luis A Martinez Borrero
(74) *Attorney, Agent, or Firm* — Procopio, Cory, Hargreaves & Savitch LLP

(57) ABSTRACT

Provided are an apparatus and method for controlling a driving device of a self-driving vehicle, the apparatus includes, a data converting unit receiving sensor data from at least one sensor of the self-driving vehicle, and converting a format of the sensor data into a predefined format to generate integrated data, a driving control message generating unit determining a driving control response for controlling the driving device of the self-driving vehicle according to the integrated data to generate a driving control message that has a pre-defined common format, and a driving command signal generating unit converting a format of the driving control message into a message format corresponding to the driving device of the self-driving vehicle to generate a driving command signal.

14 Claims, 5 Drawing Sheets

(51) Int. Cl.
  *G05D 1/02*   (2006.01)
  *G01S 7/00*   (2006.01)
  *G01S 17/02*  (2006.01)

(56) References Cited

U.S. PATENT DOCUMENTS

| | | | | | |
|---|---|---|---|---|---|
| 8,020,657 | B2* | 9/2011 | Allard | | H04L 67/12 180/167 |
| 8,108,092 | B2* | 1/2012 | Phillips | | G05D 1/0033 700/245 |
| 8,266,343 | B2* | 9/2012 | Aybay | | H04L 12/403 710/46 |
| 8,393,213 | B2* | 3/2013 | Uemura | | G01C 19/56 73/510 |
| 8,396,611 | B2* | 3/2013 | Phillips | | G05D 1/0033 700/245 |
| 8,849,494 | B1* | 9/2014 | Herbach | | B60W 30/00 701/24 |
| 8,874,300 | B2* | 10/2014 | Allard | | H04L 67/12 700/245 |
| 8,903,568 | B1* | 12/2014 | Wang | | B64C 19/00 244/189 |
| 8,972,095 | B2* | 3/2015 | Furuno | | G05D 1/024 701/23 |
| 2004/0030448 | A1* | 2/2004 | Solomon | | F41H 13/00 700/245 |
| 2004/0030571 | A1* | 2/2004 | Solomon | | G05D 1/0088 700/248 |
| 2004/0068416 | A1* | 4/2004 | Solomon | | F41H 13/00 446/454 |
| 2008/0033645 | A1* | 2/2008 | Levinson | | G01C 15/00 701/469 |
| 2008/0177507 | A1* | 7/2008 | Mian | | G06F 15/7867 702/189 |
| 2008/0234935 | A1* | 9/2008 | Wolf | | G01C 21/16 701/472 |
| 2009/0228318 | A1* | 9/2009 | Ara | | G06Q 10/06398 705/7.42 |
| 2010/0256836 | A1* | 10/2010 | Mudalige | | G08G 1/22 701/2 |
| 2012/0310466 | A1* | 12/2012 | Fairfield | | G05D 1/024 701/28 |
| 2012/0310599 | A1* | 12/2012 | Tanaka | | A01B 79/005 702/189 |
| 2013/0151170 | A1* | 6/2013 | Uchida | | G06Q 10/06 702/33 |
| 2014/0043354 | A1* | 2/2014 | Choi | | G09G 5/02 345/590 |

FOREIGN PATENT DOCUMENTS

| | | |
|---|---|---|
| KR | 10-1150261 | 5/2012 |
| KR | 10-2013-0021652 | 3/2013 |
| WO | 2010/048611 | 4/2010 |

* cited by examiner

| Magic Number | | Requested message |
|---|---|---|
| Status Code | | Time Stamp |
| Size of the data | | RAW data |

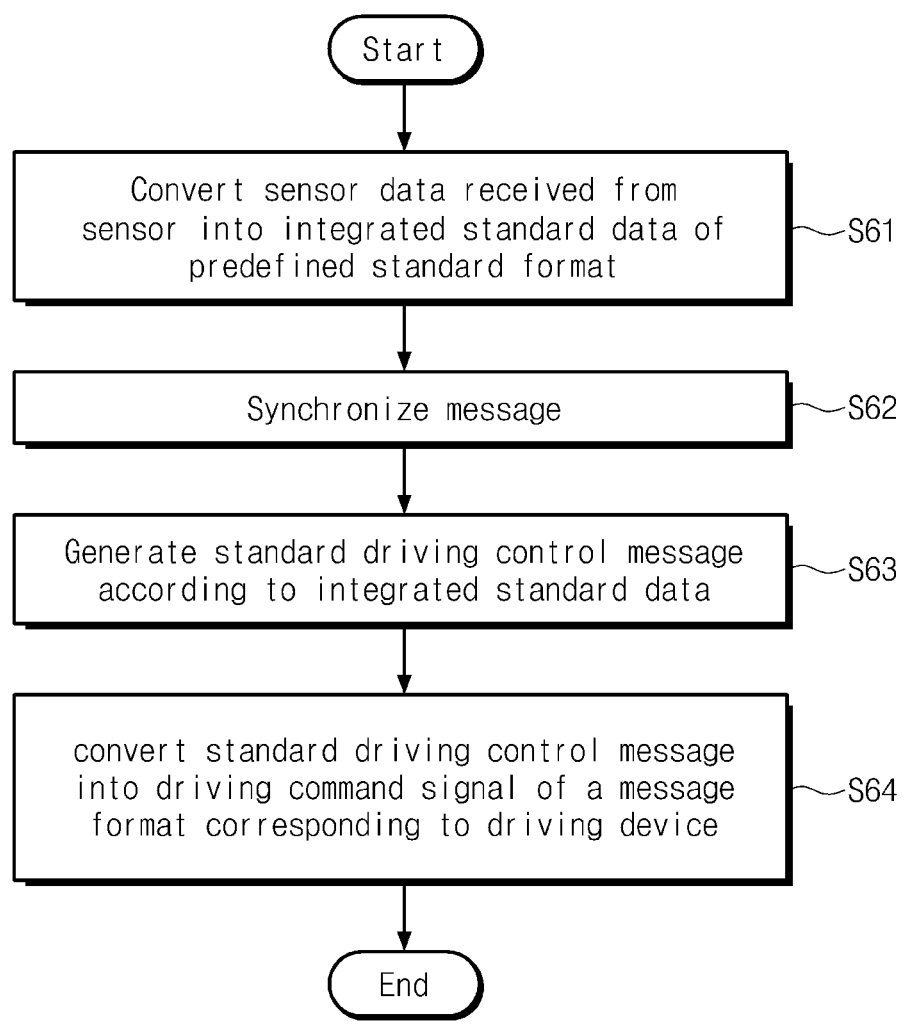

APPARATUS AND METHOD FOR CONTROLLING DRIVING DEVICE OF SELF-DRIVING VEHICLE

CROSS-REFERENCE TO RELATED APPLICATIONS

This U.S. non-provisional patent application claims priority under 35 U.S.C. §119 of Korean Patent Application No. 10-2014-0017842, filed on Feb. 17, 2014, the entire contents of which are hereby incorporated by reference.

BACKGROUND OF THE INVENTION

The present invention disclosed herein relates to an apparatus and method for controlling a driving device of a self-driving vehicle.

Typically, an autonomous unmanned vehicle, namely, a self-driving vehicle means a vehicle that has a function of autonomously recognizing a driving environment without driver's manipulation and driving to a target point. An unmanned autonomous vehicle includes a detection system (e.g., a light detection and ranging (LIDAR) module, or a GPS module, etc.) capable of autonomously grasping a location and recognizing obstacles, a central control device issuing commands such as acceleration/deceleration, and steering according to detection results of the detecting system, and a driving device performing necessary operations according to the commands like an actuator. The autonomous vehicle requires a system supporting a driving algorithm platform compatible with sensors and driving devices provided accordingly. Various sensors (e.g. a wide dynamic range (WDR) sensor and a LIDAR sensor) and driving devices that have different hardware and software protocols may be provided, and depending on the types of sensors and driving devices, or even depending on different manufacturer or name of the model of the same type of sensors and driving devices, a system that supports different platform is necessary in an unmanned vehicle. There was an issue of low compatibility since a platform designed according to formats of specific sensor and driving device cannot be applied to a vehicle that mounted different sensor due to diversified data formats according to types, manufacturers or model names of the sensors, and different signal formats for various driving devices that have various driving control accordingly. In addition, since a platform becomes designable only after types, manufacturers, and model names of all the sensors and driving devices to be applied to the autonomous vehicle are determined, design implementation and verification on driving algorithm platform that is essential in the autonomous vehicle is delayed. Furthermore, since different platforms should be designed according to specifications of sensors and driving devices to be applied to the autonomous vehicle, significant difficulty occurs in implementing the platforms. Replacing the sensors and driving devices with those of different manufacturers or model names requires increasing replacement time and a cost because a driving control algorithm is required to be changed.

SUMMARY OF THE INVENTION

The present invention provides an apparatus and method for controlling a driving device of a self-driving vehicle enabling a driving control algorithm to be reused and compatible for various self-driving vehicles that have sensors and driving devices of which hardware and software specifications are different.

The present invention also provides an apparatus and method for controlling a driving device of a self-driving vehicle, capable of controlling driving of a self-driving vehicle even in a case where information on types, manufactures, and model names of sensors and driving devices of the self-driving vehicle is not known.

Technical issues obtainable from the present invention are not limited to the technical issues mentioned above. Other unmentioned technical tasks can be clearly understood from the following description by those skilled in the art to which the present invention pertains.

Embodiments of the present invention provide apparatuses for controlling a driving device of a self-driving vehicle, the apparatus including: a data converting unit receiving sensor data from at least one sensor of the self-driving vehicle, and converting a format of the sensor data into a predefined format to generate integrated data; a driving control message generating unit determining a driving control response for controlling the driving device of the self-driving vehicle according to the integrated data to generate a driving control message having a pre-defined common format; and a driving command signal generating unit converting a format of the driving control message into a message format corresponding to the driving device of the self-driving vehicle to generate a driving command signal.

In some embodiments, the data converting unit may convert the format of the sensor data into the predefined format using pre-determined format information of the sensor and format conversion table which is set in correspondence with the pre-determined format information.

In other embodiments, the data converting unit may include a sensor database constructed with the format information of each of different sensors of an identical type, which perform the same function, and with format conversion table which is set in correspondence with the format information of the each of the sensors.

In still other embodiments, the data converting unit may further include a format converting unit extracting identification information of the sensor from the sensor data, and converting the format of the sensor data into the predefined format using format information of the sensor corresponding to the extracted identification information, and the format conversion table.

In even other embodiments, the driving command signal generating unit may convert the format of the driving control message into the message format correspond to the driving device using driving command format conversion table which is set in correspondence with pre-determined driving device.

In yet other embodiments, the driving command signal generating unit may include a driving device database constructed with driving command format conversion table set in one-to-one correspondence with each of a plurality of driving devices.

In further embodiments, the driving command signal generating unit may further include a message format converting unit extracting device identification information of the driving device from a message provided from the driving device at the time of initial connection with the driving device, and converting the format of the driving control message into the message format corresponding to the driving device using the driving command format conversion table of the driving device corresponding to the extracted device identification information.

In still further embodiments, the integrated data may include an identification number representing a sensor type, a time stamp for message synchronization, a data size, and raw data measured by the sensor.

In even further embodiments, the apparatus for a driving control may further include a message synchronizer synchronizing the integrated data using the time stamp to output the synchronized integrated data to the driving control message generating unit.

In other embodiments of the present invention, apparatuses for controlling a driving device of a self-driving vehicle include: a data converting unit receiving sensor data from at least one sensor of the self-driving vehicle, and converting a format of the sensor data into a predefined format to generate integrated data; and a driving control message generating unit determining a driving control response for controlling the driving device of the self-driving vehicle according to the integrated data to generate a driving control message having a pre-defined common format.

In still other embodiments of the present invention, apparatuses for controlling a driving device of a self-driving vehicle, include: a driving control message generating unit determining a driving control response for controlling the driving device of the self-driving vehicle using sensor data provided from at least one sensor of the self-driving vehicle, to generate a driving control message having a predefined common format; and a driving command signal generating unit converting a format of the driving control message into a message format corresponding to the driving device of the self-driving vehicle to generate a driving command signal.

In even other embodiments of the present invention, methods for controlling a driving device of a self-driving vehicle, includes: receiving sensor data from at least one sensor of the self-driving vehicle, and converting a format of the sensor data into a predefined format to generate integrated data; determining a driving control response for controlling the driving device of the self-driving vehicle according to the integrated data to generate a driving control message having a pre-defined common format; and converting a format of the driving control message into a message format corresponding to the driving device of the self-driving vehicle to generate a driving command signal.

In some embodiments, the generation of the integrated data may include converting the format of the sensor data into the predefined format using pre-determined format information of the sensor and format conversion table which is set in correspondence with the pre-determined format information.

In other embodiments, the generation of the integrated data may include extracting identification information of the sensor from the sensor data, reading the format information of the sensor corresponding to the extracted identification information and the format conversion table from a sensor database, and converting the format of the sensor data into the predefined format using the format information and the format conversion table.

In still other embodiments, the generation of the driving command signal may include converting a format of the driving control message into the message format corresponding to the driving device using driving command format conversion table which is set in correspondence with a pre-determined driving device.

In even other embodiments, the generation of the driving command signal may include extracting device identification information of the driving device from a message provided from the driving device at the time of initial connection with the driving device, reading driving format conversion table of the driving device corresponding to the extracted device identification information from a driving device database, and converting the format of the driving control message into the message format corresponding to the driving device using the driving command format conversion table.

In yet other embodiments, the method of a driving control may further include synchronizing the integrated data using a time stamp of the integrated data and outputting the synchronized integrated data to the driving control message generating unit.

In still other embodiments of the present invention, non-transitory computer readable media having a program recorded thereon, which, when executed by a computer, performs the method of a driving control of a self-driving vehicle.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 6 is a flow chart for explaining a driving control method of a self-driving vehicle according to an embodiment of the present invention.

DETAILED DESCRIPTION OF PREFERRED EMBODIMENTS

Figure 1:
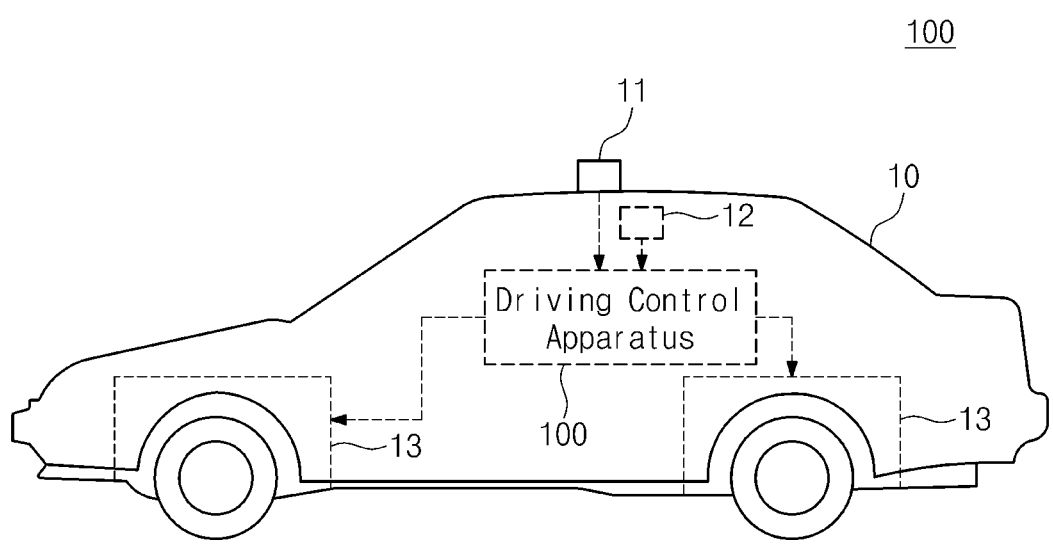
FIG. 1 is a view schematically illustrating a self-driving vehicle to which a driving control apparatus of a self-driving vehicle is provided according to an embodiment of the present invention.

Advantages and features of the present invention, and methods for achieving the same will be cleared with reference to exemplary embodiments described later in detail together with the accompanying drawings. However, the present invention is not limited to embodiments disclosed herein and only defined by the scope of claims. Even though undefined, all terms (including technical and scientific terms) used herein have the same meaning as commonly understood by one of ordinary skill in the art to which example embodiments belong. Detailed descriptions of well-known constructions will be omitted since they would obscure the invention. The same or similar reference numerals provided in each drawing denote the same or similar components.

Also, the terms '~unit' used herein may mean a unit that processes at least one function or operation. For example, they may mean a software element or a hardware element such as an FPGA or an ASIC. However, '~unit' does not mean to be limited to software or hardware. The '~unit' may be configured to be in an addressable storage medium or to play one or more processors. Accordingly, as an example, the '~unit' includes elements such as software elements, object-oriented software elements, class elements, and task elements, processes, functions, attributes, procedures, subroutines, program code segments, drivers, firmware, micro codes, circuits, data, database, data structures, tables, arrays, and variables. The elements and functions provided inside '~unit' may be divided into multiple elements or '~units' or integrated with and additional element and '~unit'.

A driving control apparatus of a self-driving vehicle according to an embodiment of the present invention includes a data converting unit, a driving control message generating unit and a driving command signal generating unit. The data converting unit receives sensor data from at least one sensor of the self-driving vehicle and converts a format of the sensor data into a pre-defined format to create integrated data. The driving control message generating unit determines a driving control response for a driving control of the self-driving vehicle according to the integrated data to create a driving control message having a pre-defined common format. The driving command signal generating unit converts a format of the driving control message into a message format corresponding to a driving device of the self-driving vehicle to create a driving command signal. The driving command signal is used to control acceleration/deceleration, steering, and so forth of the self-driving vehicle by controlling the driving device. According to embodiments of the present invention, a driving control algorithm is reusable and compatible for various self-driving vehicles that have sensors and driving devices of which hardware and software specifications are different. In addition, according to embodiments of the present invention, driving the self-driving vehicle can be controlled even when information on types, manufacturers, and model names of the sensors and driving devices thereof is not known.

FIG. 1 is a view schematically illustrating a self-driving vehicle to which a driving control apparatus is provided according to an embodiment of the present invention. The self-driving vehicle 10 may include a plurality of sensors 11 and 12. The sensors 11 and 12 may be provided to grasp a location of the self-driving vehicle 10 and recognize obstacles around the self-driving vehicle 10. In an embodiment of FIG. 1, a first sensor 11 prepared in a top portion side of the self-driving vehicle 10 may be a light detection and ranging (LIDAR) sensor for emitting a pulse laser light in the air to measure a distance by using a reflection signal or a scattering signal, and a second sensor 12 prepared inside the self-driving vehicle 10 may be a global positioning system module for measuring the location of the self-driving vehicle 10, but they are not limited hereto. For example, the self-driving vehicle 10 may include a different sensor such as a wide dynamic range (WDR) sensor.

The driving control apparatus 100 is installed in the self-driving vehicle 10 and provides a function of autonomously recognizing a driving environment without driver's manipulation and driving to a target point. The driving control apparatus 100 receives sensor data from each of the sensors 11 and 12, analyzes the sensor data to create a driving command signal, and outputs the driving command signal to a driving controller 13. In an embodiment of the present invention, the driving controller 13 corresponds to the driving device. The driving controller 13 includes, for example, an actuator decelerating or accelerating the self-driving vehicle 10, or controlling steering mechanism of the self-driving vehicle 10.

The sensors 11 and 12 have different hardware and software specifications according to types, manufacturers, or model names thereof, and may output sensor data of different formats. The driving controller 13 also has a different hardware and software specification according to a type, a manufacturer, or a model name thereof, and may require a driving command signal of a specific format. Embodiments of the present invention described herein suggest the driving control apparatus 100 of the self-driving vehicle that supports a driving control platform in correspondence with various sensors 11 and 12 and driving devices 13 of which hardware and software specifications of the self-driving vehicle 10 are different, and a driving control algorithm which is reusable and compatible.

Figure 2:
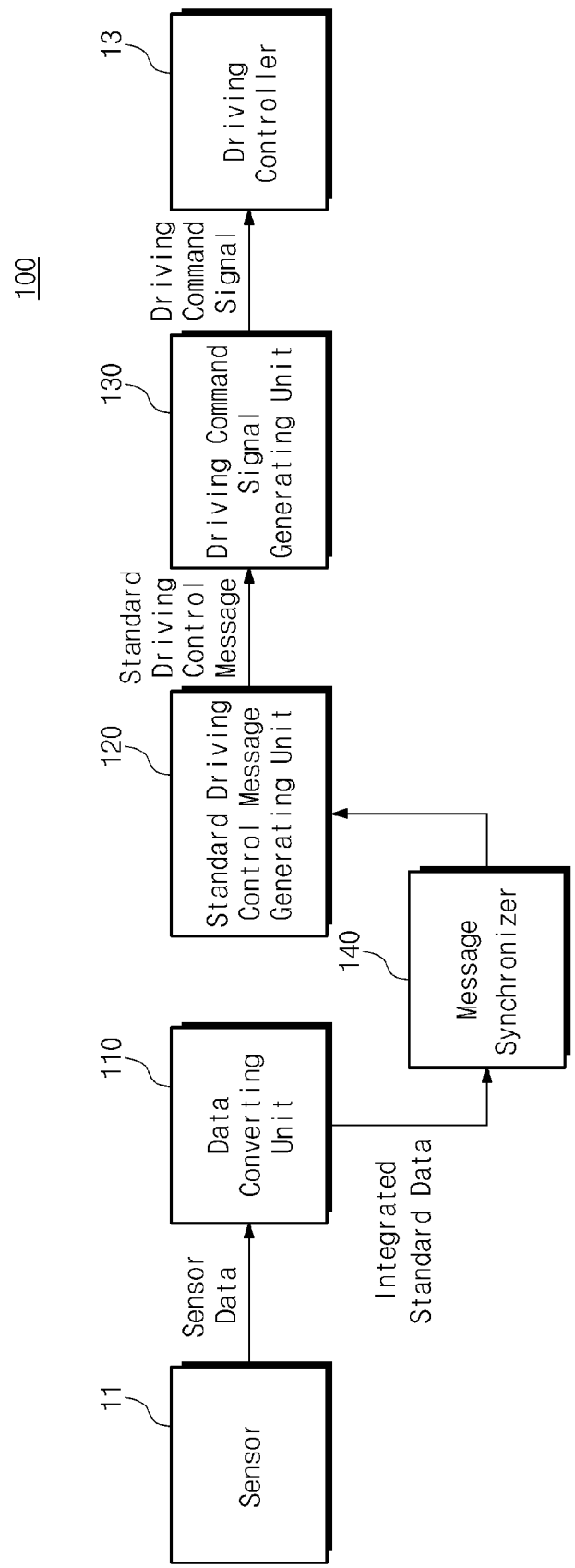
FIG. 2 is a configuration diagram schematically illustrating a driving control apparatus of a self-driving vehicle according to an embodiment of the present invention.

FIG. 2 is a configuration diagram schematically illustrating a driving control apparatus of a self-driving vehicle according to an embodiment of the present invention. Referring to FIGS. 1 and 2, the driving control apparatus 100 of the self-driving vehicle 10 includes a data converting unit 110, a driving control message generating unit 120, a driving command signal generating unit 130, and a message synchronizer 140.

The data converting unit 110 receives sensor data from the sensor 11 and converts a format of the sensor data into a predefined format to create integrated data. In an embodiment of the present invention, the data converting unit 110 converts the format of the sensor data format into the predefined format using pre-determined format information of the sensor 11 and format conversion table which is set in correspondence with the pre-determined format information to create the integrated data.

The format information may include, for example, sensor information of data header, and information of a data type and bytes of each piece of the sensor information. The sensor information may include identification information (e.g., a device ID) representing a type or a model name of the sensor 11, a request message, and a size of raw data. For example, the data converting unit 110 may analyze the sensor data for each piece of the sensor information using the format information and convert a format of each piece of the sensor information of the sensor data into the predefined format to create the integrated data. The integrated data has a data header including sensor information different from the sensor data, and time stamp information. Regardless of the type, the manufacturer, or the model name of the sensor 11, the integrated data is provided in the predefined format.

The message synchronizer 140 synchronizes the integrated data using the time stamp of the integrated data to output the synchronized integrated data to the driving control message generating unit 120. When sensor data is provided from each of a plurality of sensors, the integrated data converted by the data converting unit 110 from the sensor data which is measured at the same time by the sensors may be synchronized according to each piece of the time stamp information. For example, LIDAR data and sensor data measured by a GPS module at an identical or corresponding time point may be given an identical or corresponding time stamp and converted into the integrated data.

The driving control message generating unit 120 determines a driving control response for controlling the driving device of the self-driving vehicle 10 according to the integrated data to create a driving control message having a pre-defined common format. Since the format of the integrated data is standardized in the common format regardless of the sensor 11, the driving control message generating unit 120 may create a driving control message by an identical driving control algorithm, regardless of the sensor 11. The driving control message may include a type or identification information of the driving controller 13 to be controlled according to the driving command signal, or driving command information such as acceleration/deceleration, steering of the self-driving vehicle 10. The driving control message is provided in the common format regardless of the specification of the sensor 11 or the driving controller 13.

The driving command signal generating unit 130 converts the format of the driving control message into a message format corresponding to the driving controller 13 of the self-driving vehicle 10 to create the driving command signal. In an embodiment of the present invention, the driving command signal generating unit 130 converts the format of the driving control message into a message format corresponding to the driving device by using driving command format conversion table which is set in correspondence with the pre-determined driving controller 13 to create the driving command signal. The driving controller 13 may recognize the driving command information in a unit of byte using the driving command signal provided in a requested message format, and accordingly control the self-driving vehicle 10.

Figures 3, 4:
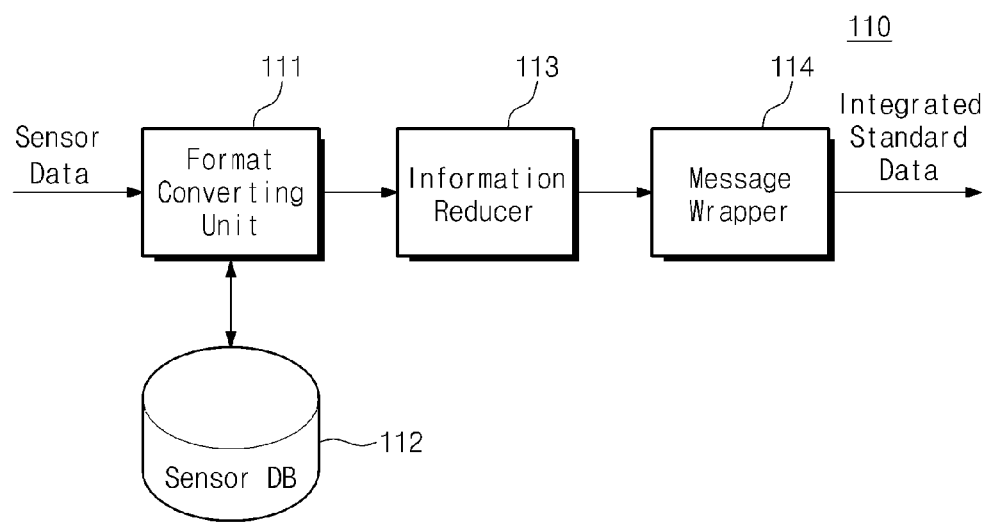
FIG. 3 is a configuration diagram illustrating in detail a data converting unit configuring a driving control apparatus of a self-driving vehicle according to an embodiment of the present invention.
FIG. 4 is a conceptual diagram illustrating an example of integrated data created by a driving control apparatus of a self-driving vehicle according to an embodiment of the present invention.

FIG. 3 is a configuration diagram illustrating in detail a data converting unit configuring a driving control apparatus of a self-driving vehicle according to an embodiment of the present invention. Referring to FIG. 3, the data converting unit 110 includes a format converting unit 111, a sensor database 112, an information reducer 113, and a message wrapper 114. The sensor database 112 may be constructed with format information of each of different sensors of the same type, which perform the same function, and with format conversion table which is set in correspondence with the format information of each of the sensors. The format conversion unit 111 extracts identification information of the sensor 11 from the sensor data, and converts the format of the sensor data into the predefined format using the format information and the format conversion table regarding the sensor 11, which corresponds to the extracted identification information.

For example, the format converting unit 111 may recognize sensor 11 by searching for identification information which is included in a bit stream of the sensor data among preset identification information of a plurality of sensors, and recognizes the sensor 11. The format converting unit 111 may extract the format information and format conversion table corresponding to the recognized sensor 11 from the sensor database 112, and convert the sensor information of the sensor data into the predefined format using the format conversion table.

The information reducer 113 removes unnecessary data among the sensor information of the sensor data to contract the information and minimize data quantity to be processed. The message wrapper 114 summarizes a message to create the integrated data that has the predefined format. The integrated data is delivered to the message synchronizer 140 using a communication interface (not illustrated). According to an embodiment of FIG. 3, even though information such as types, manufacturers, or model names of the sensors of the self-driving vehicle 10 is not known, the integrated data may be created from the sensor data using a driving control algorithm provided in a cross platform type. According an embodiment of the present invention, a platform manager may design a platform for a driving control, even though the platform manager does not know about an architecture of an internal system.

FIG. 4 is a conceptual diagram illustrating an example of integrated data created by a driving control apparatus of a self-driving vehicle according to an embodiment of the present invention. Referring to FIG. 4, the integrated data may include, in an integrated format type, an identification number (e.g., a magic number) representing a type of a sensor (e.g., a LIDAR sensor, or a GPS sensor), a requested message requested by a sensor, a status code representing error information, a time stamp for synchronization, a size of the data, and raw data measured by the sensor.

Figure 5:
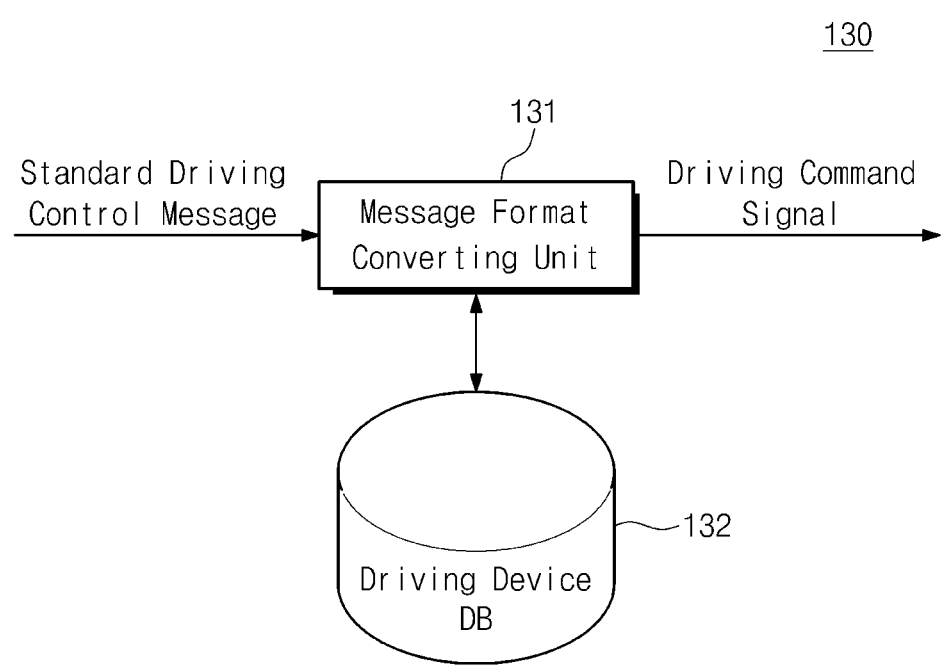
FIG. 5 is a configuration diagram illustrating in detail a driving command signal generating unit configuring a driving control apparatus of a self-driving vehicle according to an embodiment of the present invention.

FIG. 5 is a configuration diagram illustrating in detail a driving command signal generating unit configuring a driving control apparatus of a self-driving vehicle according to an embodiment of the present invention. Referring to FIG. 5, the driving command signal generating unit 130 includes a message format converting unit 131 and a driving device database 132. The driving device database 132 is constructed with driving command format conversion table which is set in one-to-one correspondence with each of a plurality of driving devices. In an embodiment of the present embodiment, the message format converting unit 131 may extract device identification information of the driving controller 13 from a message provided from the driving controller 13 at the time of initial connection with the driving controller 13 through the communication interface (not illustrated), read driving command format conversion table regarding the driving controller 13, which corresponds to the extracted device identification information, from the driving device database 132, and convert the format of the driving control message into a message format corresponding to the driving controller 13 using the driving command format conversion table. According to an embodiment of FIG. 5, even though information such as a type, a manufacturer, or a model name of the driving controller 13 of the self-driving vehicle 10 is not known, the driving command signal may be created for the driving control of the self-driving vehicle 10 using the driving control algorithm provided in a cross platform.

FIG. 6 is a flow chart for explaining a driving control method of a self-driving vehicle according to an embodiment of the present invention. Steps of a driving control method of a self-driving vehicle illustrated in FIG. 6 may be executed by a driving control apparatus 100 illustrated in FIGS. 1 to 5. Referring to FIGS. 1, 2, and 6, the driving control method of the self-driving vehicle 10 includes a step S61 of receiving, by the data converting unit 110, sensor data provided from the sensors 11 and 12 of the self-driving vehicle 10 and converting a format of the sensor data into a predefined format to create integrated data; a step S62 of synchronizing, by the message synchronizer 140, the integrated data using a time stamp of the integrated data to output the synchronized integrated data to the driving control message generating unit 120; a step S63 of determining, by the driving control message generating unit 120, a driving control response for the driving control of the self-driving vehicle 10 according to the integrated data and creating a driving control message that has a predefined common format; and a step S64 of converting a format of the driving control message into a message format corresponding to the driving controller 13 of the self-driving vehicle 10 and creating a driving command signal. According to the present invention, one integrated platform can correspond to sensors and devices that have different hardware and software protocols of various unmanned vehicles and is compatible with platforms of various sensors and driving devices. The driving control apparatus 100 of the self-driving vehicle 10 according to an embodiment of the present invention may control driving of the self-driving vehicle 10, even though information such as types, manufacturers, or model names of the sensors 11 and 12 and the driving devices 13 is not known. According an embodiment of the present invention, a platform manager may design a platform for a driving control, even though the platform manager does not know about an architecture of an internal system.

The embodiments of the present invention can be written as computer programs and can be implemented in general-use digital computers that execute the programs using a computer readable recording medium. Examples of the computer readable recording medium include, but is not limited to, volatile memories such as static RAM (SRAM), dynamic RAM (DRAM), and synchronous RAM (SRAM), nonvolatile memories such as read only memory (ROM), programmable ROM (PROM), electrically programmable ROM (EPROM), electrically erasable and programmable ROM (EEPROM), flash memory device, phase-change RAM (PRAM), magnetic RAM (MRAM), resistive RAM (RRAM), and ferroelectric RAM (FRAM), floppy disks, hard disks, or optical reading media such as CD-ROMs or DVDs.

To outline the effects of the present invention, first, according to embodiments of the present invention, a driving control algorithm is reusable and compatible for various self-driving vehicles that have sensors and driving devices of which hardware and software specifications are different.

Second, according to embodiments of the present invention, driving the self-driving vehicle can be controlled even when information on types, manufacturers, and model names of the sensors and driving devices therein are not known.

The effects of the present invention are not limited to the two major effects that are mentioned above. Other effects not mentioned above may be clearly understood through detailed description and accompanying drawings by those skilled in the art.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for controlling a driving device of a self-driving vehicle, the apparatus comprising:
   a sensor database that is constructed with a format information of each of predetermined different sensors capable of grasping a location of a vehicle or recognizing obstacles around a vehicle, and with format conversion table which is set in correspondence with the format information of the each of the predetermined different sensors;
   at least one sensor installed at the self-driving vehicle to grasp a location of the self-driving vehicle or recognize obstacles around the self-driving vehicle, each of the at least one sensor being configured to output sensor data comprising an identification information of the sensor outputting the sensor data; and
   at least one processor in communication with the sensor database and the at least one sensor, and configured to:
   a receive the sensor data from each of the at least one sensor;
   extract the identification information from the sensor data by searching for the identification information which is included in a bit stream of the sensor data;
   extract format information and format conversion table corresponding to the extracted identification information from the sensor database;
   convert a format of the sensor data into a predefined format using the extracted format information and format conversion table to generate integrated data having the predefined format;
   determine a driving control response for controlling the driving device of the self-driving vehicle according to the integrated data to generate a driving control message that has a predefined common format; and
   convert a format of the driving control message into a message format corresponding to the driving device of the self-driving vehicle to generate a driving command signal.

2. The apparatus of claim 1, wherein the sensor database is constructed with the format information of each of the predetermined different sensors of an identical type, which perform the same function.

3. The apparatus of claim 1, wherein the at least one processor is configured to:
   convert the format of the driving control message into the message format corresponding to the driving device using driving command format conversion table which is set in correspondence with pre-determined driving device.

4. The apparatus of claim 1, further comprising:
   a driving device database that is constructed with driving command format conversion table which is set in one-to-one correspondence with each of a plurality of driving devices.

5. The apparatus of claim 4, wherein the at least one processor is configured to:
   extract device identification information of the driving device from a message provided from the driving device at the time of initial connection with the driving device, and
   convert the format of the driving control message into the message format corresponding to the driving device using the driving command format conversion table of the driving device corresponding to the extracted device identification information.

6. The apparatus of claim 1, wherein the integrated data comprises an identification number representing a sensor type, a time stamp for message synchronization, a data size, and raw data measured by the at least one sensor.

7. The apparatus of claim 6, wherein the at least one processor is configured to:
   synchronize the integrated data using the time stamp to output the synchronized integrated data.

8. An apparatus for controlling a driving device of a self-driving vehicle, the apparatus comprising:
   a sensor database that is constructed with a format information of each of predetermined different sensors capable of grasping a location of a vehicle or recognizing obstacles around a vehicle, and with format conversion table which is set in correspondence with the format information of the each of the predetermined different sensors;
   at least one sensor installed at the self-driving vehicle to grasp a location of the self-driving vehicle or recognize obstacles around the self-driving vehicle, each of the at least one sensor being configured to output sensor data comprising an identification information of the sensor outputting the sensor data; and
   at least one processor in communication with the sensor database and the at least one sensor, and configured to:
   receive the sensor data from each of the at least one sensor;
   extract the identification information from the sensor data by searching for the identification information which is included in a bit stream of the sensor data;
   extract format information and format conversion table corresponding to the extracted identification information from the sensor database;

convert a format of the sensor data into a predefined format using the extracted format information and format conversion table to generate integrated data having the predefined format; and determine a driving control response for controlling the driving device of the self-driving vehicle according to the integrated data to generate a driving control message that has a pre-defined common format.

9. An apparatus for controlling a driving device of a self-driving vehicle, the apparatus comprising:
   a driving device database that is constructed with driving command format conversion table which is set in one-to-one correspondence with each of a plurality of predetermined different driving devices capable of decelerating or accelerating a vehicle, or controlling a steering mechanism of a vehicle;
   at least one driving device installed at the self-driving vehicle to decelerate or accelerate the self-driving vehicle, or control the steering mechanism of the self-driving vehicle; and
   at least one processor in communication with the driving device database and the at least one driving device;
   wherein each of the at least one driving device is configured to send a message comprising a device identification information of the driving device sending the message to the at least one processor at the time of initial connection with the at least one processor, and
   the at least one processor is configured to:
   receive the message from each of the at least one driving device at the time of initial connection with the driving device;
   extract the device identification information from the message provided from the at least one driving device;
   extract the driving command format conversion table corresponding to the extracted device identification information from the driving device database;
   determine a driving control response for controlling the driving device of the self-driving vehicle using sensor data provided from at least one sensor of the self-driving vehicle, to generate a driving control message that has a predefined common format; and
   convert a format of the driving control message into a message format corresponding to the driving device of the self-driving vehicle using the extracted driving command format conversion table to generate a driving command signal.

10. A method for controlling a driving device of a self-driving vehicle, the method comprising:
    receiving sensor data from each of at least one sensor of the self-driving vehicle by at least one processor, the at least one sensor being installed at the self-driving vehicle to grasp a location of the self-driving vehicle or recognize obstacles around the self-driving vehicle, each of the at least one sensor being configured to output sensor data comprising an identification information of the sensor outputting the sensor data;
    extracting the identification information from the sensor data by at least one processor, by searching for the identification information which is included in a bit stream of the sensor data;
    extracting format information and format conversion table corresponding to the extracted identification information from a sensor database by at least one processor, the sensor database being constructed with a format information of each of predetermined different sensors capable of grasping a location of a vehicle or recognizing obstacles around a vehicle, and with format conversion table which is set in correspondence with the format information of the each of the predetermined different sensors;
    converting a format of the sensor data into a predefined format using the extracted format information and format conversion table by at least one processor to generate integrated data having the predefined format;
    determining a driving control response for controlling the driving device of the self-driving vehicle according to the integrated data by at least one processor to generate a driving control message that has a pre-defined common format; and
    converting a format of the driving control message into a message format corresponding to the driving device of the self-driving vehicle by at least one processor to generate a driving command signal.

11. The method of claim 10, wherein the generation of the driving command signal comprises converting a format of the driving control message into the message format corresponding to the driving device using driving command format conversion table which is set in correspondence with a predetermined driving device.

12. The method of claim 10, wherein the generation of the driving command signal comprises:
    extracting device identification information of the driving device from a message provided from the driving device at the time of initial connection with the driving device;
    reading driving command format conversion table of the driving device corresponding to the extracted device identification information from a driving device database; and
    converting the format of the driving control message into the message format corresponding to the driving device using the driving command format conversion table.

13. The method of claim 10, further comprising synchronizing the integrated data using a time stamp of the integrated data by at least one processor,
    wherein the determination of the driving control response comprises:
    determining the driving control response according to the synchronized integrated data to generate the driving control message.

14. A non-transitory computer readable medium storing a program causing a computer to execute control process for a driving device of a self-driving vehicle, the control process comprising:
    accepting sensor data from each of at least one sensor of the self-driving vehicle, the at least one sensor grasping a location of the self-driving vehicle or recognizing obstacles around the self-driving vehicle, each of the at least one sensor outputting sensor data comprising an identification information of the sensor outputting the sensor data;
    extracting the identification information from the sensor data by searching for the identification information which is included in a bit stream of the sensor data;
    extracting format information and format conversion table corresponding to the extracted identification information from a sensor database, the sensor database being constructed with a format information of each of predetermined different sensors capable of grasping a location of a vehicle or recognizing obstacles around a vehicle, and with format conversion table which is set in correspondence with the format information of the each of the predetermined different sensors;

converting a format of the sensor data into a predefined format using the extracted format information and format conversion table to generate integrated data having the predefined format;

determining a driving control response for controlling the driving device of the self-driving vehicle according to the integrated data to generate a driving control message that has a pre-defined common format; and converting a format of the driving control message into a message format corresponding to the driving device of the self-driving vehicle to generate a driving command signal.

* * * * *